United States Patent
Sikand et al.

(10) Patent No.: US 10,044,562 B2
(45) Date of Patent: Aug. 7, 2018

(54) AUTOMATIC PROVISIONING OF LISP MOBILITY NETWORKS WHEN INTERCONNECTING DC FABRICS

(71) Applicant: Cisco Technology, Inc., San Jose, CA (US)

(72) Inventors: Vrishab Sikand, Lexington, MA (US); Victor Moreno, Carlsbad, CA (US); Liqin Dong, San Jose, CA (US); Lifen Tian, San Jose, CA (US); Shyam Kapadia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 14/932,719

(22) Filed: Nov. 4, 2015

(65) Prior Publication Data

US 2017/0126496 A1     May 4, 2017

(51) Int. Cl.
*G06F 15/177* (2006.01)
*H04L 12/24* (2006.01)
*H04L 29/12* (2006.01)

(52) U.S. Cl.
CPC ...... *H04L 41/0813* (2013.01); *H04L 41/0886* (2013.01); *H04L 61/103* (2013.01); *H04L 41/5054* (2013.01); *H04L 61/2084* (2013.01)

(58) Field of Classification Search
CPC ........... H04L 41/0813; H04L 41/0886; H04L 61/103; H04L 41/5054; H04L 61/2084
See application file for complete search history.

(56) References Cited

U.S. PATENT DOCUMENTS

| | | | | |
|---|---|---|---|---|
| 9,246,702 | B1* | 1/2016 | Sharma | H04L 12/2896 |
| 9,344,383 | B2* | 5/2016 | Nguyen | H04L 49/25 |
| 2006/0080318 | A1* | 4/2006 | Huston | H04L 41/0886 |
| 2012/0173694 | A1* | 7/2012 | Yan | H04L 12/4641 |
| | | | | 709/223 |
| 2013/0232245 | A1 | 9/2013 | Antosz et al. | |
| 2014/0195695 | A1* | 7/2014 | Okita | H04L 45/245 |
| | | | | 709/239 |
| 2014/0297875 | A1* | 10/2014 | Cheng | H04L 61/103 |
| | | | | 709/226 |

(Continued)

FOREIGN PATENT DOCUMENTS

CN          102868612 A   *   1/2013   ........... H04L 45/10

OTHER PUBLICATIONS

International Search Report from related application WO2017079647 dated Nov. 5, 2017.

(Continued)

*Primary Examiner* — Oanh Duong
(74) *Attorney, Agent, or Firm* — Patterson + Sheridan, LLP (57) ABSTRACT

Techniques are disclosed for configuring a LISP mobility network. A management tool receives a configuration for a network fabric. The configuration specifies values for one or more attributes associated with a Locator ID Separation Protocol (LISP)-enabled network. The management tool generates one or more commands based on the specified values for the one or more attributes associated with the LISP-enabled network. The generated commands are distributed to a plurality of network devices in the network fabric. Each network device executes the one or more commands to configure the network fabric.

20 Claims, 9 Drawing Sheets

(56) References Cited

U.S. PATENT DOCUMENTS

| | | | | |
|---|---|---|---|---|
| 2015/0156183 A1* | 6/2015 | Beyer | ................. | H04L 63/08 |
| | | | | 726/4 |
| 2015/0229522 A1* | 8/2015 | Poutievski | .......... | H04L 41/0813 |
| | | | | 709/221 |
| 2015/0245249 A1* | 8/2015 | Grootwassink | ..... | H04L 12/4633 |
| | | | | 370/328 |
| 2015/0288656 A1* | 10/2015 | Yoon | ................... | H04L 61/2507 |
| | | | | 370/329 |
| 2016/0065531 A1* | 3/2016 | Xiaopu | ................ | H04L 61/103 |
| | | | | 709/238 |
| 2016/0117179 A1* | 4/2016 | Morton | ............... | G06F 9/44505 |
| | | | | 713/100 |
| 2016/0164832 A1* | 6/2016 | Bellagamba | ............ | H04L 67/10 |
| | | | | 726/12 |
| 2016/0216982 A1* | 7/2016 | Variath | ............... | G06F 9/45558 |
| 2017/0005923 A1* | 1/2017 | Babakian | ............. | H04L 69/324 |
| 2017/0078241 A1* | 3/2017 | Zhang | ................... | H04L 61/103 |

OTHER PUBLICATIONS

Tsuzaki Yoshiharu et al: Development of an Automatic Managing System of Wide-Area Distributed Networks With Defined Network Specification; IOth International Conference on Network and Service Management (CNSM) and Workshop, IFIP, Nov. 17, 2014 (Nov. 17, 2014). pp. 443-446.

Max Ardica: Dynamic Fabric Automation Architechure; Cisco Live, 2013. pp. 1-52.

\* cited by examiner

Add Network

Organization: ABCXYZCorp
Partition: Sales
VRF Name: ABCXYZCorp:Sales
Network Name: west-net
Multicast Group Address:
Network Role: Host Network
Gateway IPv4 Address: 192.168.11.1
☑ Extend the Network across the Fabric
Netmask Length: 24
Gateway IPv6 Address:
Prefix Length:
Secondary DNS Server:

Network ID — 405
◉ Segment ID Only
   Segment ID: 100001
○ Mobility Domain and VLAN

Network Mobility
◉ LISP Mobility Network
○ LISP Static Network

Profile Name: Select

Profile Parameters
vlanId:
segmentId: 100001
vrfName: ABCXYZCorp:Sales
gatewayIP: 192.168.11.1
vrfDhcp:

Service Configuration Parameters
VM Manager IP:
Static IP Start:
Static IP End:
vSwitch Network ID:
Distributed Switch ID:

OK    Cancel

```
feature lisp
vrf context RLOC-DC1
  ip lisp itr-etr
  ip lisp map-resolver 10.10.10.222
  ip lisp etc map-server
       10.10.10.200 key regkey vrf context ABCXYZCorp:Sales
  ip lisp itr-etr
  ip lisp locator-vrf RLOC-DC1
  lisp instance-id 99999
       register-route-notifications tag 65550 lisp dynamic eid ABCXYZCorp:Sales:192.168.11.0
database-mapping 192.168.11.0.0.0/24
10.10.10.200  priority 1 weight 50
10.10.20.200  priority 1 weight 50
```
— 410

AUTOMATIC PROVISIONING OF LISP MOBILITY NETWORKS WHEN INTERCONNECTING DC FABRICS

TECHNICAL FIELD

Embodiments presented in this disclosure generally relate to network communication, and more specifically, to automatically configuring data center network fabrics with Locator ID Separation Protocol (LISP) functionality.

BACKGROUND

The Location ID Separation Protocol (LISP) is a technology for network virtualization used to deploy Internet-based virtual private networks (VPNs). LISP provides on-demand tunneling for traffic exchanges across VPN sites and data centers. Generally, a LISP-supported network architecture uses two namespaces instead of an IP address. One namespace includes endpoint identifiers (EIDs), assigned to endpoint devices for identifying network sessions between the devices. The other namespace includes routing locators (RLOCs), assigned to network devices (e.g., routers, switches, etc.) for routing traffic through the network. EIDs may be mapped to one or more RLOCs. Further, a LISP mapping system maintains a database to handle endpoint reachability information, allowing traffic to be tunneled to an appropriate data center based on information obtained from the mapping system. Using two distinct namespaces allows a LISP-supported device to maintain an IPv4 (or IPv6) address even if the device migrates to another network location. Such a naming scheme provides relatively high scalability and more efficient multi-homing capability. In addition, this approach provides virtualized workload mobility across interconnected network fabrics.

One concern in providing LISP mobility support to network fabrics is initially configuring a given fabric. A LISP mobility network generally includes a LISP egress tunnel router (ETR), an ingress tunnel router (ITR), a proxy ETR (PETR), a proxy ITR (PITR), map resolver (MR), and map server (MS) device. Current approaches allow auto-configuration of devices in a network fabric upon attachment of a network host to a first hop device in the fabric. However, to configure a LISP network, an administrator generally has to manually register "day one" command-line interfaces (CLIs) on each network device. Because data centers can include many network devices and subnets in different physical locations, the amount of CLIs required to configure can be numerous.

BRIEF DESCRIPTION OF THE DRAWINGS

So that the manner in which the above recited features of the present disclosure can be understood in detail, a more particular description of the disclosure, briefly summarized above, may be understood by referring to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented herein discloses a method. The method generally includes receiving, by a management application, a configuration for a network fabric. The configuration specifies values for one or more attributes associated with a Locator ID Separation Protocol (LISP)-enabled network. The method also includes generating one or more commands based on the specified values for the one or more attributes associated with the LISP-enabled network. The method also includes distributing the generated commands to a plurality of network devices in the network fabric. Each network device executes at least one of the generated commands to configure the network fabric.

Another embodiment presented herein discloses a non-transitory computer-readable medium storing instructions, which, when executed, perform an operation. The operation generally includes receiving, by a management application, a configuration for a network fabric. The configuration specifies values for one or more attributes associated with a Locator ID Separation Protocol (LISP)-enabled network. The operation also includes generating one or more commands based on the specified values for the one or more attributes associated with the LISP-enabled network. The operation also includes distributing the generated commands to a plurality of network devices in the network fabric. Each network device executes at least one of the generated commands to configure the network fabric.

Yet another embodiment presented herein discloses a system having a processor and a memory. The memory stores program code, which, when executed by the processor, performs an operation. The operation generally includes receiving, by a management application, a configuration for a network fabric. The configuration specifies values for one or more attributes associated with a Locator ID Separation Protocol (LISP)-enabled network. The operation also includes generating one or more commands based on the specified values for the one or more attributes associated with the LISP-enabled network. The operation also includes distributing the generated commands to a plurality of network devices in the network fabric. Each network device executes at least one of the generated commands to configure the network fabric.

Example Embodiments

Embodiments presented herein disclose techniques for automatically provisioning Locator ID Separation Protocol (LISP)-enabled networks when connecting routed data center fabrics with one another. More specifically, embodiments presented herein automate the provisioning of LISP configurations on network devices of a given data center fabric. In one embodiment, a data center network management (DCNM) server maintains configurations of a LISP network. The LISP network may interconnect one or more data center fabrics. The DCNM server provides a management tool that allows an individual (e.g., a network operator or administrator) to deploy and configure a network.

In one embodiment, the management tool may include a configuration interface through which the operator specifies "day one" parameters for a data center fabric to attach to a network infrastructure. For example, the interface may provide templates used to auto-configure a network fabric. In one embodiment, the interface provides a LISP support flag. Enabling the flag indicates an intention of the operator to deploy the fabric with LISP functionality, e.g., a LISP mobility network. Further, when an administrator enables the flag, the management tool generates LISP-specific configuration commands (including the support flag) to be executed on network edge devices in the data center fabric. In one embodiment, the configuration enables LISP-specific attributes for the network (e.g., a mobile or static LISP network, priority and weight for the fabric, etc.), enables methods to dynamically configure mobility networks, specify a set of routing locator (RLOC) locations for the fabric, and specify mapping server locations. Further, the management tool may register the RLOC locations of the fabric with existing map servers in the LISP network.

As a result, when a network host attaches to a first hop device in the data center fabric, the DCNM sends the LISP support flag to the first hop device. In turn, the first hop device generates a CLI indicating that the connecting network is a LISP-enabled network. For example, the CLI may include instantiations for LISP instance IDs, route notification tags, dynamic EIDs, and mapping properties. Further, executing the CLI results in BGP (Border Gateway Protocol) advertising the network with an opaque extended community indicating that LISP is enabled for the network. An alternative embodiment may substitute the CLI with a local data structure reflecting the state of the LISP flag.

Advantageously, embodiments presented herein provide a distributed approach to automating day one configuration of LISP networks when interconnecting data center fabrics. Rather than configuring individual devices to support LISP functionality, an operator may specify LISP attributes, e.g., through an interface or script. Doing so allows the operator to maintain existing workflows with reduced operational complexity. Further, such an approach provides for more reliable scalability, as embodiments presented herein can automatically configure networks for LISP functionality even as the networks grow in size.

Figure 1:
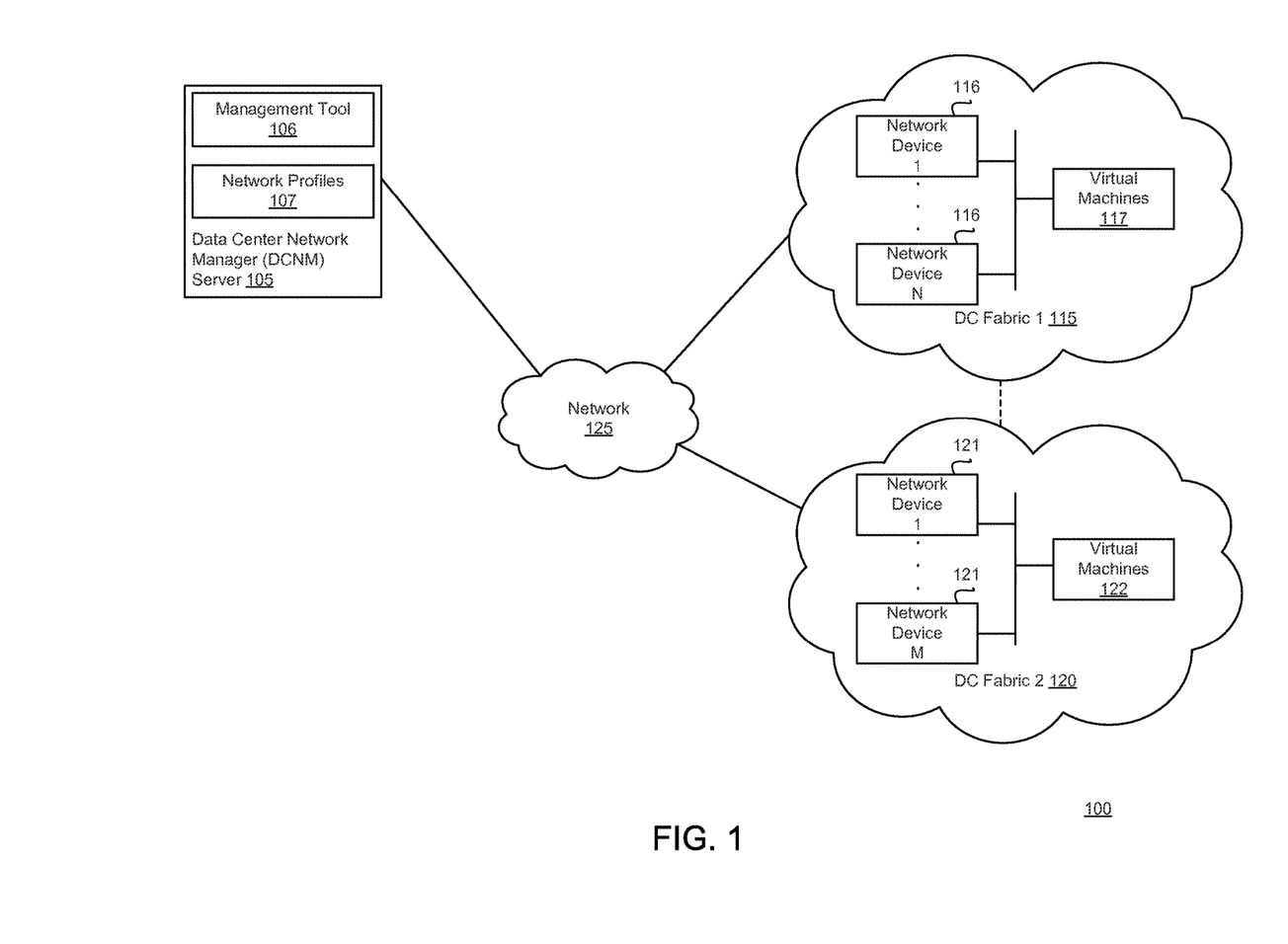
FIG. 1 illustrates an example computing environment, according to one embodiment.

FIG. 1 illustrates an example computing environment 100, according to one embodiment. As shown, computing environment 100 includes a data center network manager (DCNM) server 105, a data center (DC) fabric 1 115, a DC fabric 2 120, and a network 125. In one embodiment, the network 125 is representative of a wide area network (WAN) 125.

The DCNM server 105 includes a management tool 106 and one or more network profiles 107. The DCNM server 105 manages infrastructure of a given network via the management tool 106. The management tool 106 automates provisioning of network elements and resources (e.g., to DC fabric 1 115 and DC fabric 2 120). The management tool 106 may provide an interface, e.g., accessible as a REST-based API or a web browser, through which a network operator can configure a network. Further, the management tool 106 allows the operator to configure Locator ID Separation Protocol (LISP) networks. As known, LISP provides a two-namespace approach for a given network, where one namespace being an endpoint identifier (EID) namespace and the other being a routing locator (RLOC) namespace. The EID namespace generally applies to LISP-supported sites, while the RLOC namespace applies to non-LISP sites. The EID namespace is generally not advertised within RLOC namespace. Instead, LISP functionality is generally deployed on edge network devices in a fabric. The edge network devices perform egress tunnel router (ETR) and ingress tunnel router (ITR) functions of a LISP device. Further, as part of the LISP mapping system, the edge network devices maintain database information of mappings between an EID to one or more RLOCs. The mappings represent routing between endpoint devices to specified network locations.

In one embodiment, the DC fabrics 1 115 and 2 120 represent network fabrics interconnected with one another (represented by the dotted line). The DC fabrics 115 and 120 may host virtual machines 117 and 122 (or other virtualized workloads and processes), respectively, on top of resources located within each fabric. Further, each DC fabric may include a number of network devices (e.g., network devices 1-N 116 of DC fabric 1 115 and network devices 1-M 121 of DC fabric 2 120). In one embodiment, the network devices 116 and 121 may represent routers, switches, and the like. Further, at least one of the network devices in each fabric may represent an edge device connecting the fabric to the RLOC namespace (e.g., the Internet). In a LISP network, the edge device may perform LISP-specific functions. For example, a LISP-enabled edge device implements egress and ingress tunnel routing. Further, the edge device may perform map server and map resolver functions, such as maintaining the mapping database between EIDs to RLOCs and resolving mapping requests. Of course, such map server and map resolver functions may be performed by other components in an RLOC network.

In one embodiment, the management tool 106 allows the network operator to set up a given DC fabric with LISP functionality when interconnecting the fabric to a LISP network. The interface provided by the management tool 106 may allow the network operator to enable a LISP flag for a network profile 107 corresponding to the DC fabric. Once enabled, the operator may specify LISP-specific attributes for the DC fabric. For example, the operator can specify map server addresses, an amount of RLOCs, whether the network is a mobile or a static network, and the like. Once specified, the management tool 106 generates commands associated with a "day zero" configuration of the network. The management tool 106 may send the commands to an edge network device in the fabric. In turn, the edge device carries out the commands to generate a "day one" configuration of the LISP network.

Figure 2:
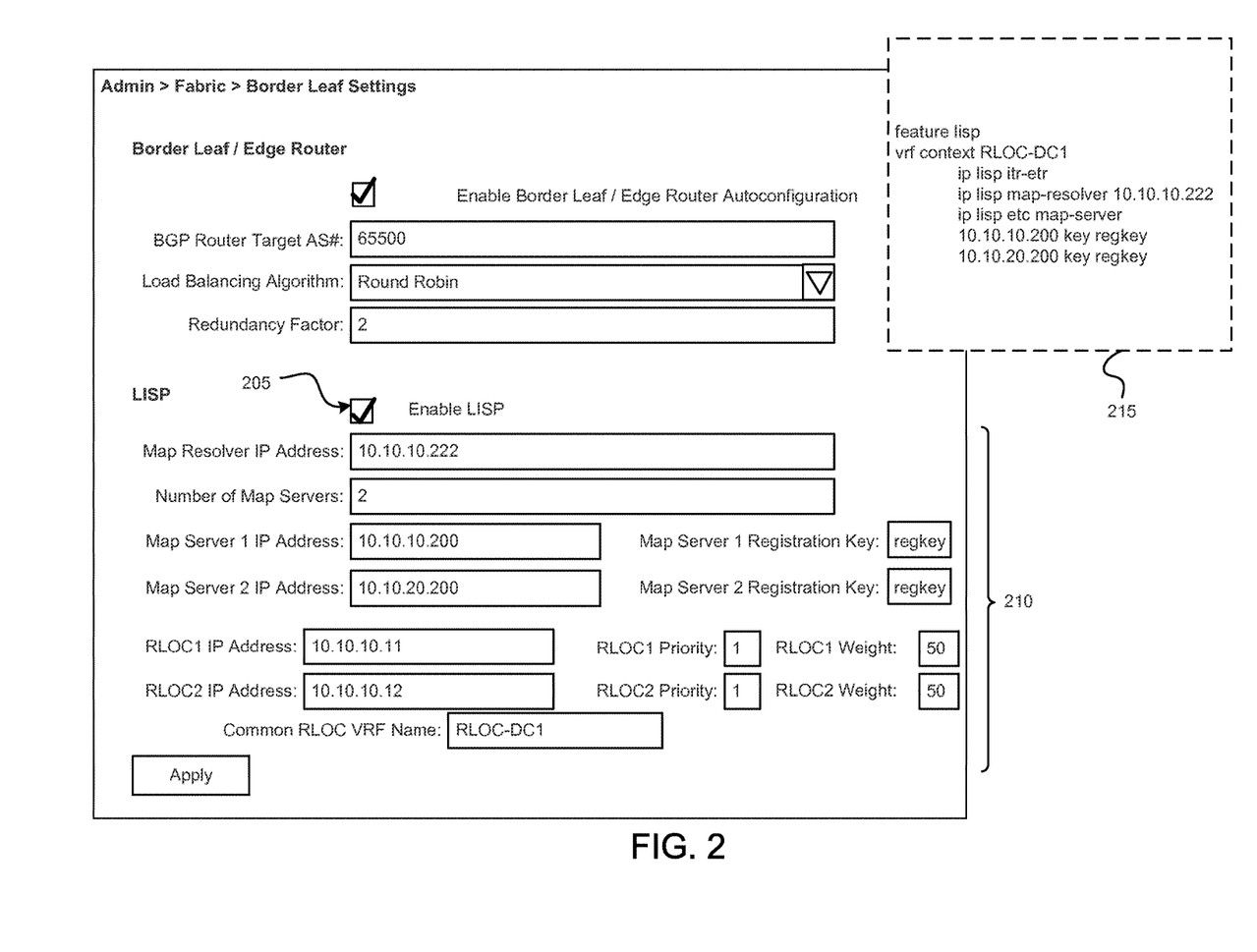
FIG. 2 illustrates an example of configuring border leaf settings to support a Locator ID Separation Protocol (LISP), according to one embodiment.

FIG. 2 illustrates an example of configuring border leaf settings to support a Locator ID Separation Protocol (LISP), according to one embodiment. In particular, FIG. 2 depicts an interface of the management tool 106. Illustratively, the interface allows a network operator to specify edge router settings for a given fabric to be interconnected with a LISP network as part of a day zero configuration. For example, the interface provides fields that the operator may use to enter configuration settings, e.g., a Border Gateway Protocol (BGP) router target autonomous system (AS) number, a load balancing algorithm, and a redundancy factor value.

As shown, the interface also provides a section where the operator can specify LISP-specific attributes 210. The interface includes a LISP support flag 205 that the operator may enable (e.g., via a checkbox) to indicate that the fabric is being configured with LISP functionality. If enabled, the operator may specify values for day zero configuration LISP attributes 210, as a map resolver IP address, an amount of map servers, IP addresses for the map servers, a number of RLOCs, IP addresses for the RLOCs, etc.

After the operator enters the settings, the management tool 106 generates LISP-specific device configuration commands 215 corresponding to the values specified by the operator. The commands 215 represent a device configuration at boot-up of an edge device in the fabric being configured. The management tool 106 may send the configuration commands 215 to an edge device.

Figure 3:
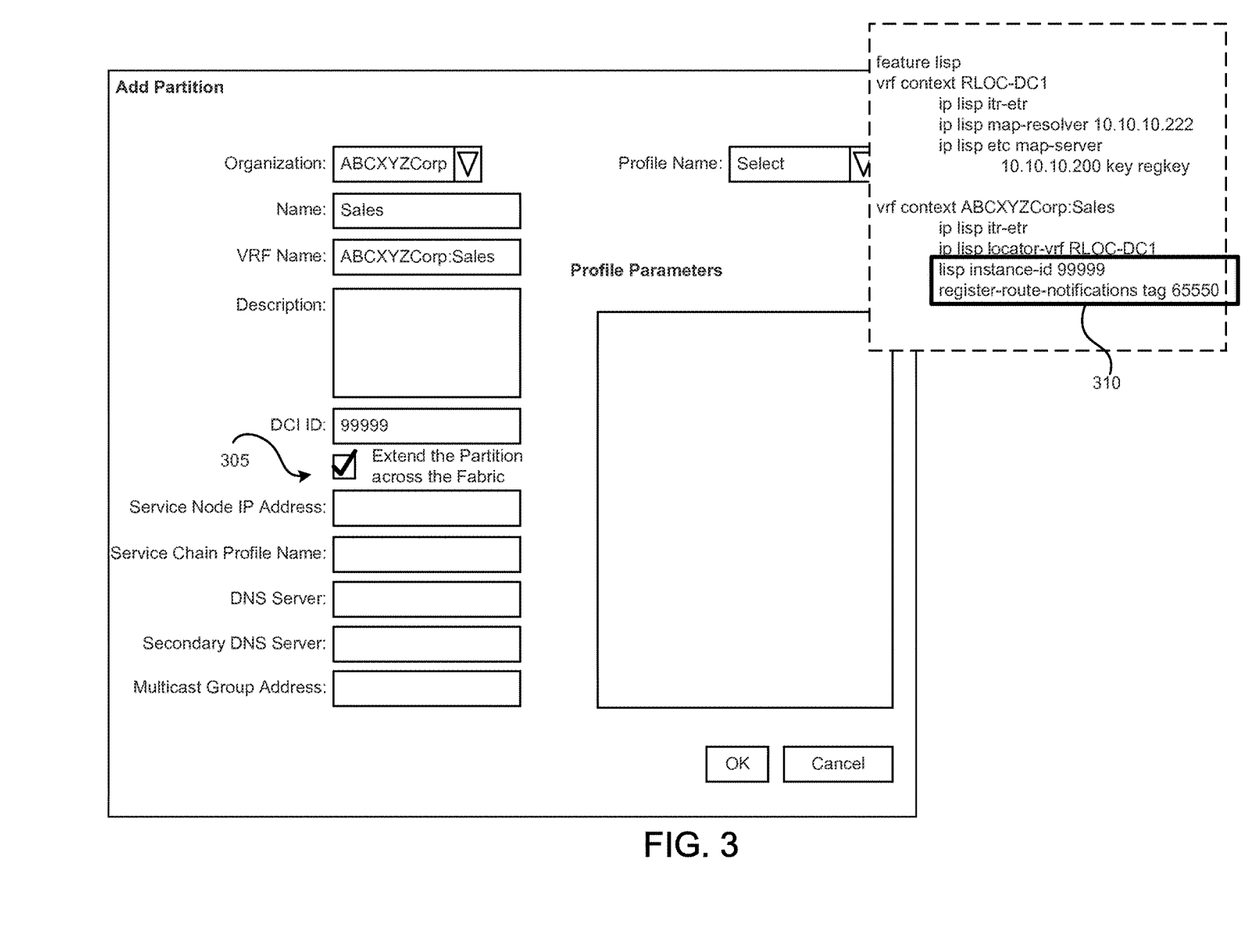
FIG. 3 illustrates an example of configuring a Locator ID Separation Protocol (LISP)-supported network partition, according to one embodiment.

FIG. 3 illustrates an example of configuring a Locator ID Separation Protocol (LISP)-supported network partition, according to one embodiment. In particular, FIG. 3 depicts an interface of the management tool 106 that an operator may use to extend virtual routing and forwarding (VRF) to the network fabric being configured. The operator uses the interface to specify a day one configuration for a network partition having the VRF extension.

Illustratively, the interface allows the operator to specify values for attributes such as an organization, name, VRF name, and the like. Further, the operator can also specify a data center interconnect (DCI) ID, which may also correspond to a desired ID to designate for a LISP instance. Further, the interface provides an option 305 that indicates that the network partition is to be extended across the network fabric.

After the operator specifies desired values to the attributes, the management tool 106 generates day one configuration commands 310 for the VRF extension. The commands 310 are representative of a LISP ingress tunnel router (ITR) and egress tunnel router (ETR) configuration. The management tool 106 may transmit the commands 310 to a designated edge router in the network fabric. As stated, the edge router of the network fabric may carry out ITR and ETR functions for a LISP architecture. Illustratively, the DCI ID specified in the interface is used as the LISP instance ID included in the commands 310. Further, the commands 310 may specify a route tag that represents an Autonomous System Number (ASN) of the fabric. The route tag may be subsequently used to simplify processes that populate a routing information base used in the network.

Figure 4:
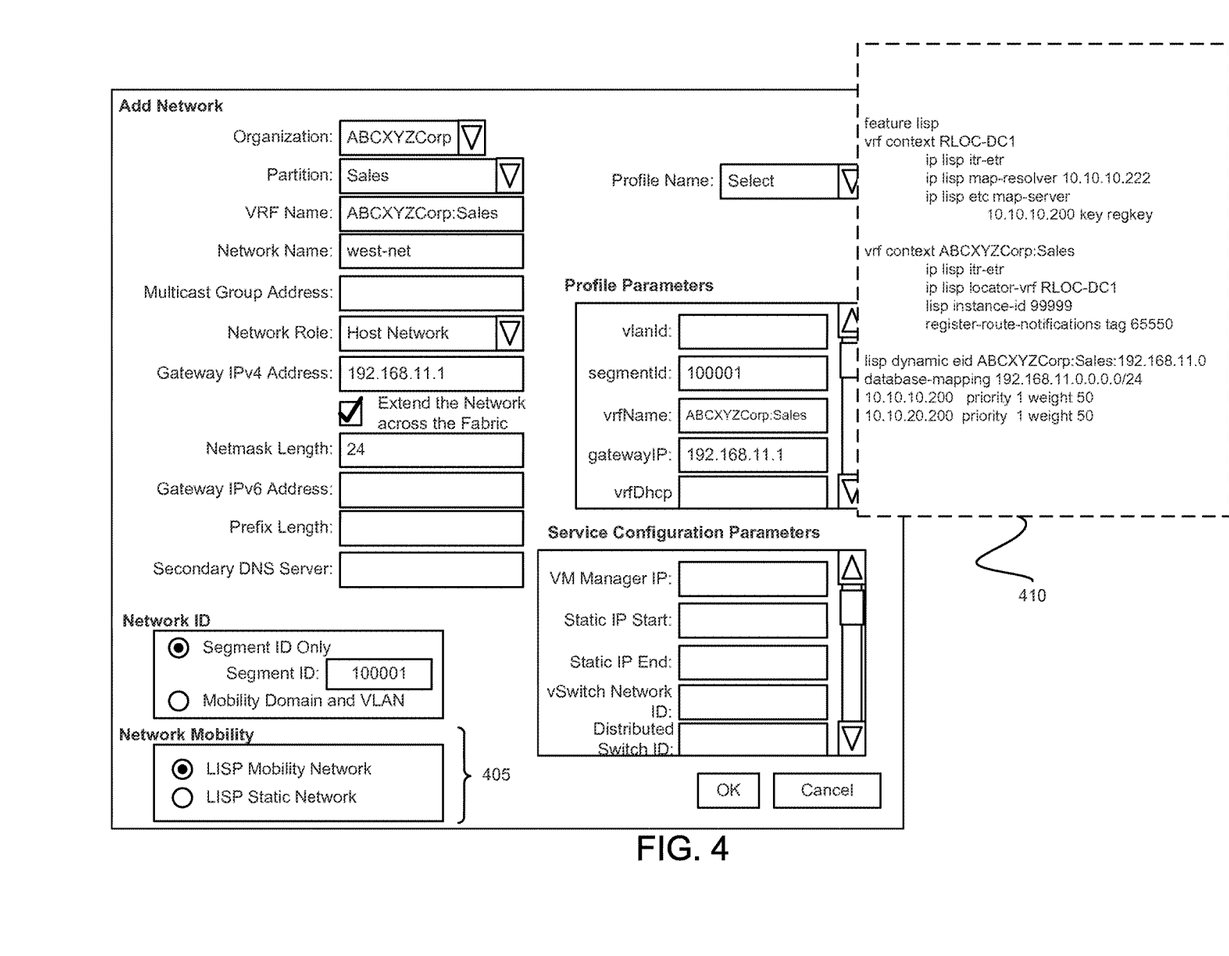
FIG. 4 illustrates an example of configuring a LISP-supported network, according to one embodiment.

FIG. 4 illustrates an example of configuring a LISP-supported network, according to one embodiment. In particular, FIG. 4 depicts an interface of the management tool 106 that allows the operator to further configure network properties. For instance, the interface provides a dropdown box that that operator can access to select the partition created in the interface shown in FIG. 3. The operator may further specify a network name, a network role, a gateway IPv4 (or IPv6) address, and the like. Further, the interface provides a network mobility section 405 that allows the operator to specify whether the network corresponds to a LISP network, e.g., a mobility or a static network. A mobile network refers to IP subnets where mobile workloads are connected—the network can be present in more than one network fabric. In contrast, a static network refers to a network that is local to a given network fabric.

After the operator specifies values for the desired attributes, the management tool 106 may generate LISP-specific commands 410 corresponding to the values specified in the interface. The commands 410 are representative of a LISP ITR and ETR configuration. For example, the commands 410 indicate an address to be used for a map resolver function in the ITR, as well as an address used for a map server function in the ETR. The management tool 106 may store the commands 410 in a network management database.

Figure 5:
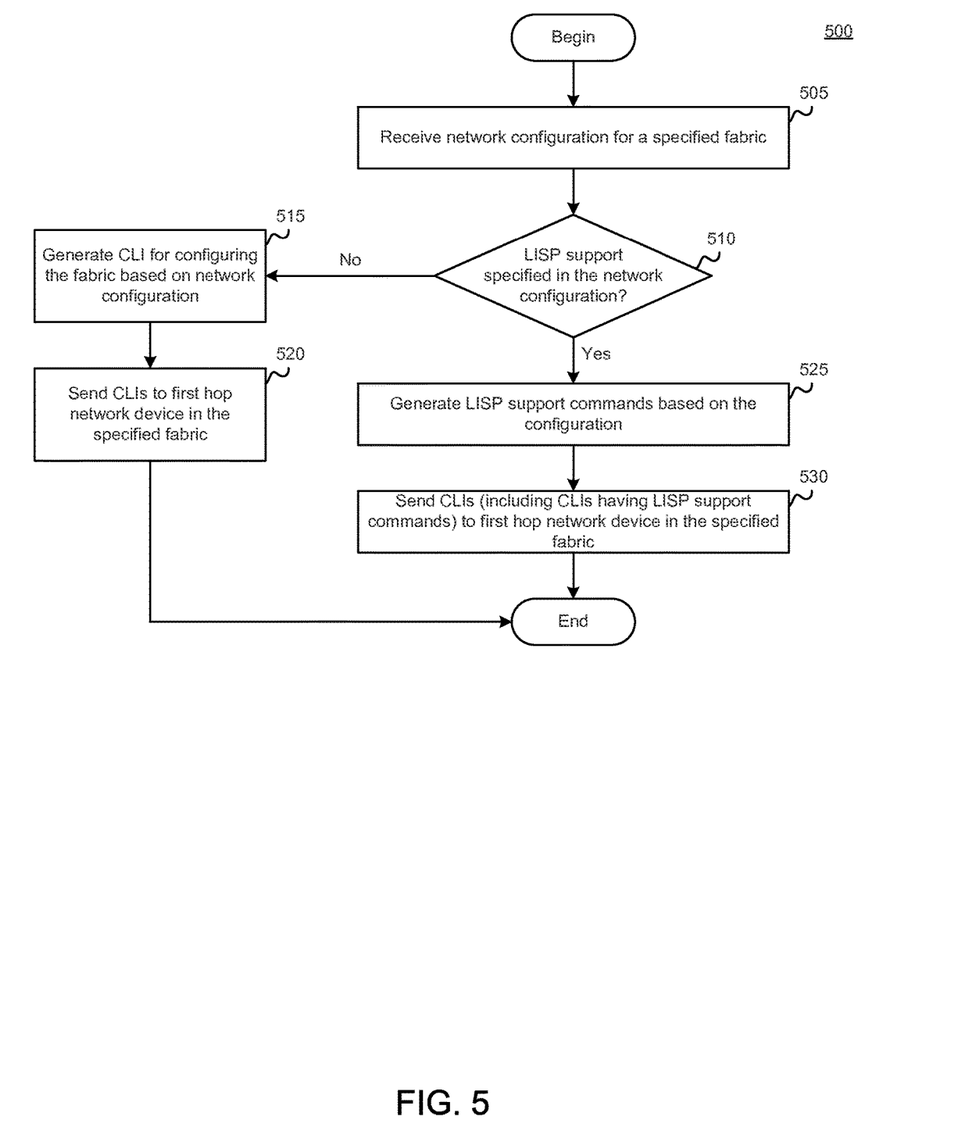
FIG. 5 illustrates a method for configuring a network fabric via a management tool to support LISP mobility networks, according to one embodiment.

FIG. 5 illustrates a method 500 for configuring a network fabric to support LISP mobility networks, according to one embodiment. As shown, method 500 begins at step 505, where the management tool 106 receives a network configuration for a specified data center fabric. The network configuration may correspond to values for specified parameters provided in an interface of the management tool 106.

At step 510, the management tool 106 determines whether the network configuration indicates that the network should be configured to support LISP. For example, the network configuration may determine whether a flag indicating LISP support is enabled. If not, then the management tool 106 generates a configuration corresponding to a network that is not configured for LISP. For example, at step 515, the management tool generates CLI used to configure the fabric based on values specified in the network configuration. At step 520, the management tool 520 sends the CLI to the first hop device in the specified network fabric.

If LISP support is specified in the network configuration, then at step 525, the management tool 106 generates CLI that includes LISP-specific configuration based on the specified values in the network configuration. At step 530, the management tool 106 sends the CLI (as well as other CLI generated for the network configuration) to the first hop network device in the specified network fabric.

Figure 6:
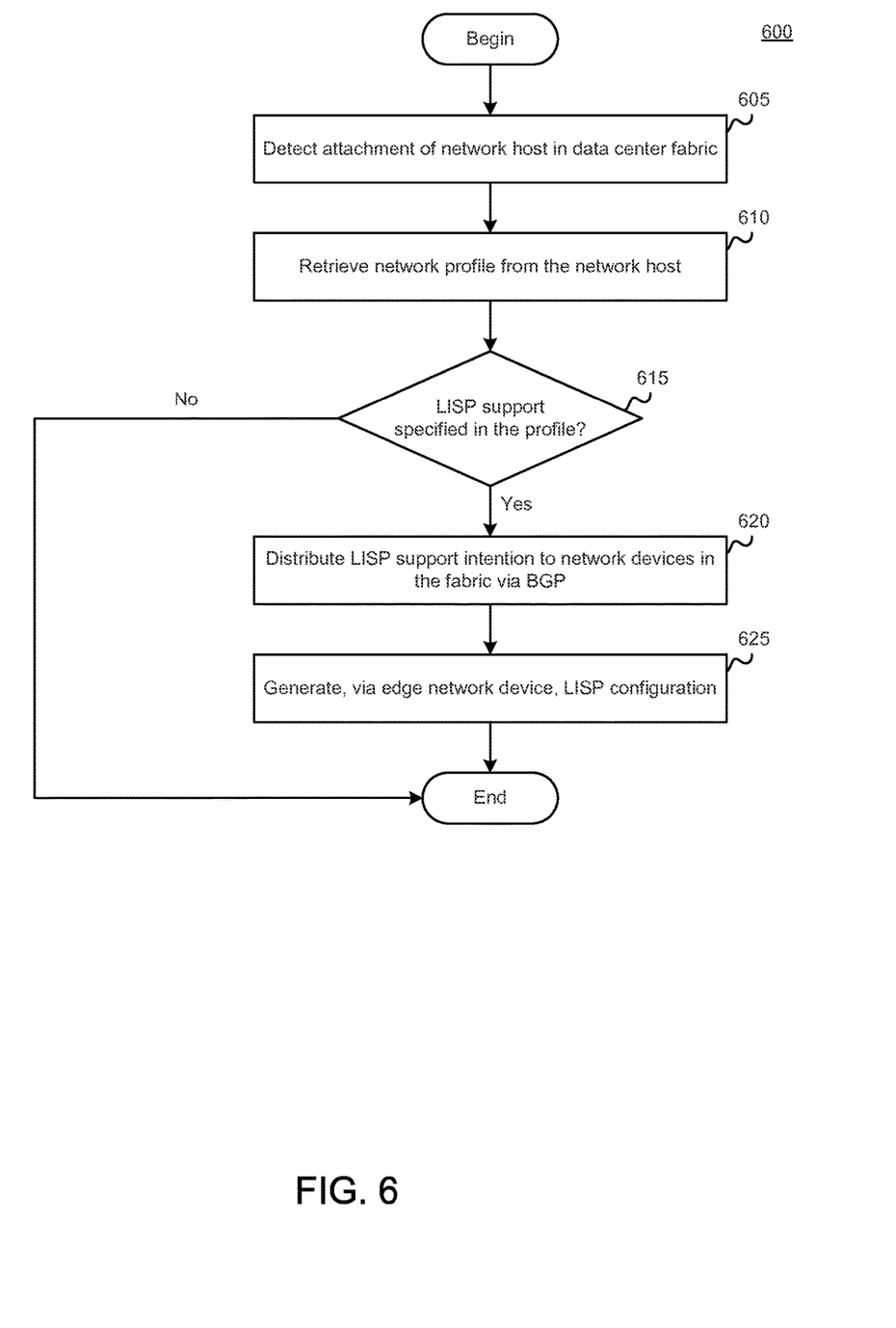
FIG. 6 illustrates a method for configuring a network fabric via a first hop network device to support LISP mobility networks, according to one embodiment.

FIG. 6 illustrates a method 600 for configuring a data center fabric to support LISP mobility networks, according to one embodiment. As shown, method 600 begins at step 605, where a first hop router of a network fabric detects an attachment of a network host in the data center fabric. At step 610, the first hop router retrieves the network profile from the network host.

At step 615, the first hop router determines whether LISP support is specified in the profile. If not, then the method 600 ends. Otherwise, at step 630, the first hop router distributes a LISP support intention to network devices in the fabric. The first hop router may do so via the Border Gateway Protocol (BGP). At step 625, an edge router in the network fabric generates LISP configuration CLIs.

Figure 7:
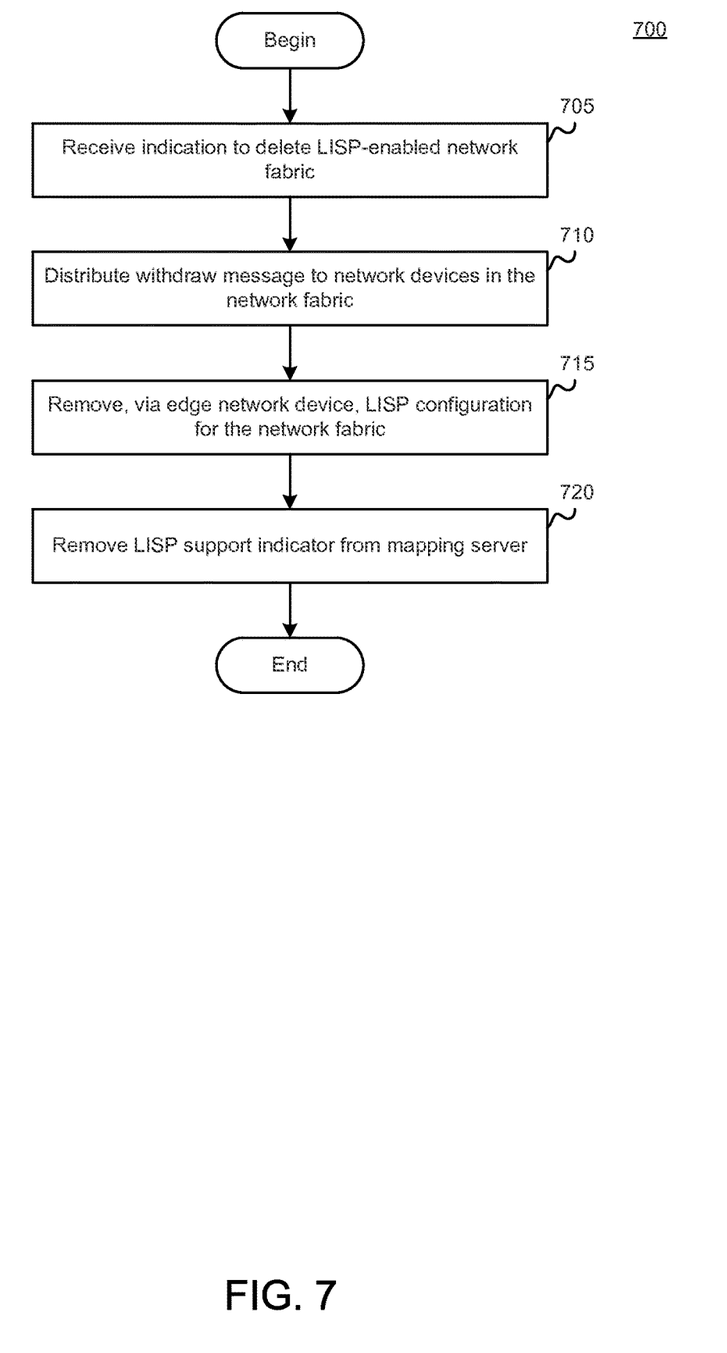
FIG. 7 illustrates a method for deleting a LISP mobility network fabric, according to one embodiment.

FIG. 7 illustrates a method 700 for deleting a LISP mobility network fabric, according to one embodiment. As shown, method 700 begins at step 705, where the management tool 106 receives an indication to delete a specified LISP-enabled network fabric. For instance, the operator may explicitly specify, through the management tool 106, to delete the network. As another example, the operator may disable LISP support through the management tool 106 to do so.

At step 710, the management tool 106 sends a withdraw message to network devices in the network fabric, including the first hop device. The management tool 106 may also generate other commands used (e.g., by the edge network devices) to remove LISP configuration from the network. The first hop device receives the commands at the first hop device.

At step 715, the first hop device removes the LISP configuration for the network fabric and deletes the network. Further, the first hop network device removes the LISP support indicator from the mapping server of the fabric. Alternatively, the last host leaving the network triggers the network deletion from the device. Further, the first hop device distributes the withdraw message to edge devices in the network via a Border Gateway Protocol (BGP). In turn, the edge devices remove LISP network CLIs.

Figure 8:
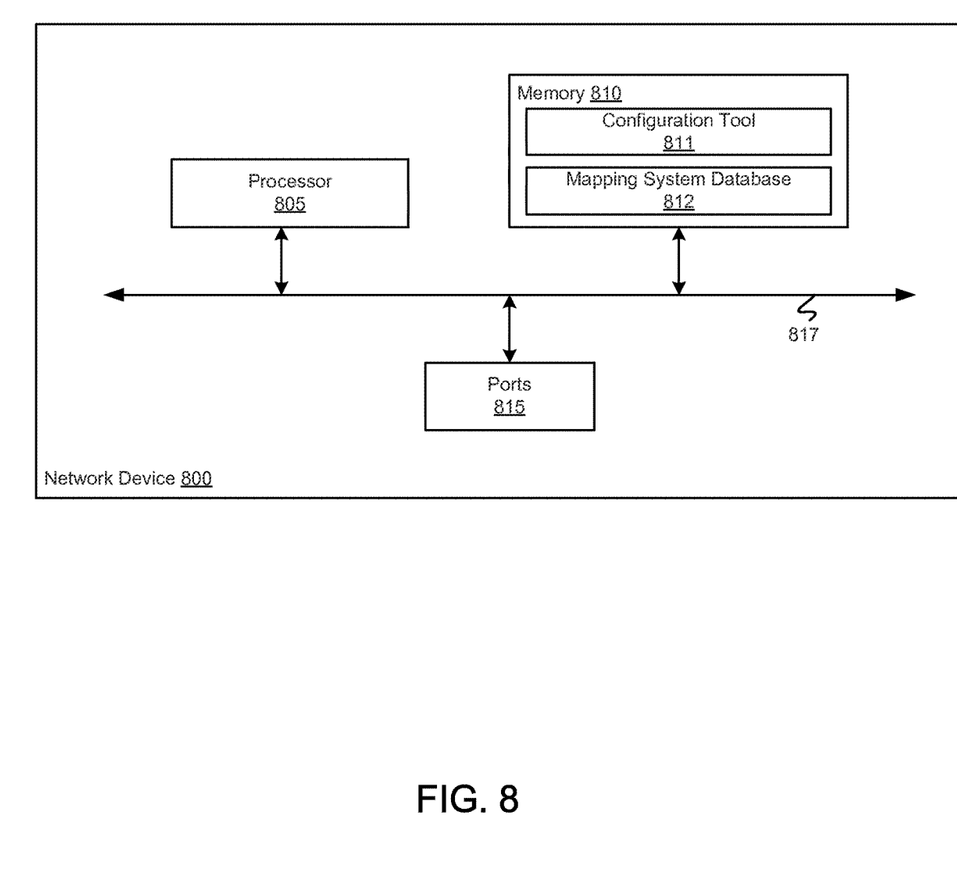
FIG. 8 illustrates an example network device, according to one embodiment.

FIG. 8 illustrates an example network device 800, according to one embodiment. The network device 800 may be an edge router in one embodiment. Here, "router" is generally used to refer to devices that forward packets based on network and higher layer information, according to the Open Systems Interconnection (OSI) model. In other embodiments, the network device 800 may be a switch, gateway, or other network device.

As shown, the network device 800 includes a processor 805, a memory 810, small form-factor pluggable (SFP) ports 815 (e.g., Ethernet ports), and a bus 817 (e.g., a PCI bus). Note, the components of the network device 800 are provided for explanatory purposes. One of skill in the art can configure the network device 800 in many other ways. In one embodiment, the processor 805 is responsible for router tasks such as routing table computations, network management, and generally packet processing. The processor 805 typically accomplishes all of these functions under the control of software including, e.g., an operating system and any appropriate applications software stored in the memory 810.

Illustratively, the memory 810 includes a configuration tool 811 and a mapping system database 812. The configuration tool 811 is configured to receive configuration commands from a DCNM server. The configuration tool 811 may execute the configuration commands and distribute the configuration to other network devices within a given fabric. Further, in one embodiment, the configuration tool 811 can execute commands (e.g., sent from the DCNM server) used to configure the fabric for LISP functionality. For example, the configuration tool 811 initializes network LISP mapping servers and resolvers based on settings specified in a given configuration.

In one embodiment, the mapping system database 812 is configured to maintain EID-to-RLOC mappings for devices. As discussed, EIDs can be at different RLOCs based on the EID-RLOC mappings, depending on where a given EID attaches to the network. In contrast, RLOCs are associated with a network topology and are reachable by traditional routing. EID-to-RLOC mappings may be resolved using entries stored in the mapping system database 812 so that the routing is redirected for inbound optimization when virtualized processes (e.g., virtual machines) move across data center fabrics. Note, some network devices 400 in a data center fabric might not include a mapping system database 812 process, although at least one instance of the mapping system database 812 should be reachable in some device in the network. Network devices that do not have the mapping system database 812 may instead include a mapping cache that maintains EID-to-RLOC mappings retrieved from the mapping system database 812.

Figure 9:
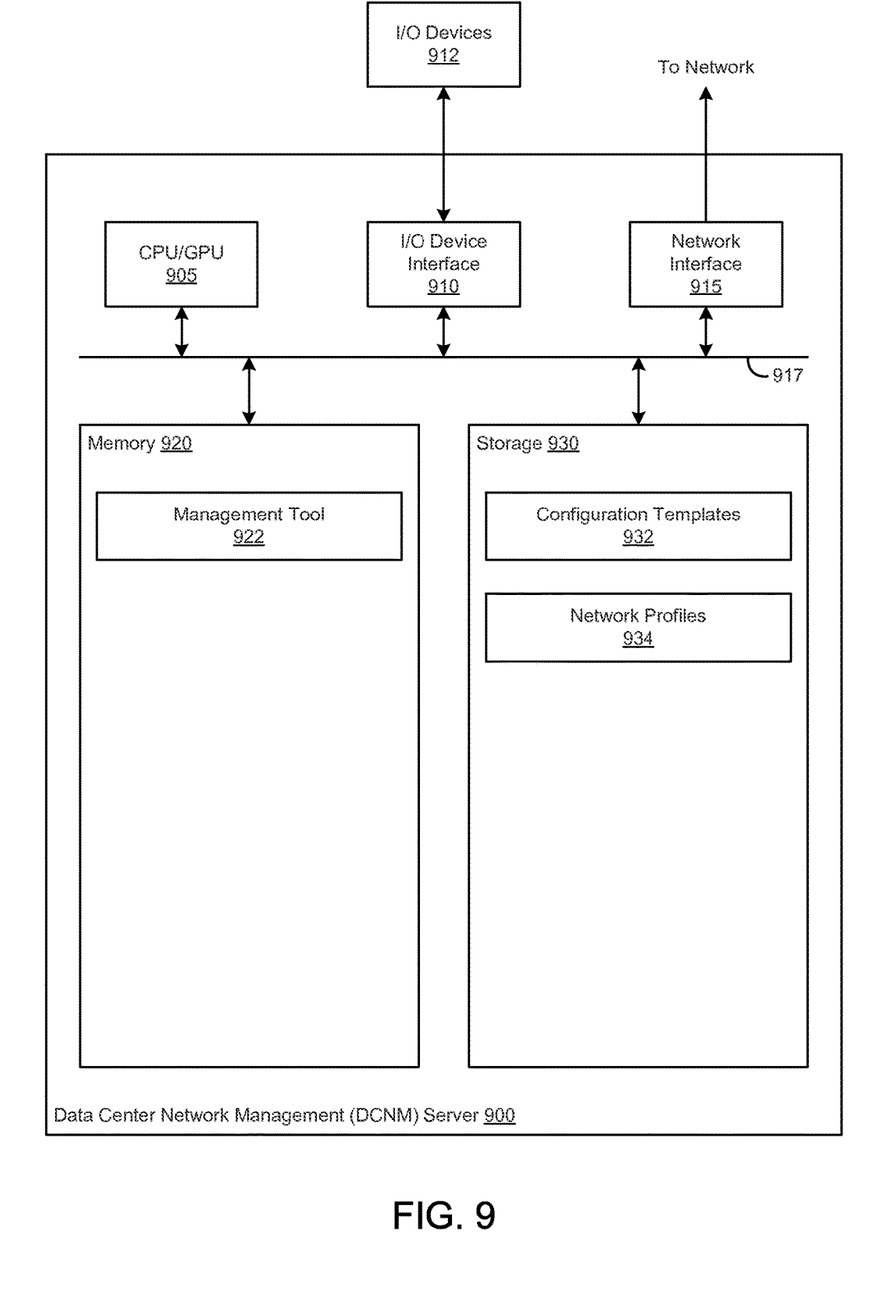
FIG. 9 illustrates an example data center network management server, according to one embodiment.

FIG. 9 illustrates a DCNM server configured to automatically provision a data center network fabric with LISP functionality, according to one embodiment. As shown, DCNM server 900 includes, without limitation, a central processing unit (CPU) 905, a network interface 915, a memory 920, and storage 930, each connected to a bus 917. DCNM server 900 may also include an I/O device interface 910 connecting I/O devices 912 (e.g., keyboard, display and mouse devices) to the DCNM server 900. Further, in context of this disclosure, the computing elements shown in DCNM server 900 may correspond to a physical computing system (e.g., a system in a data center) or may be a virtual computing instance executing within a computing cloud.

CPU 905 retrieves and executes programming instructions stored in memory 920 as well as stores and retrieves application data residing in the storage 930. The interconnect 917 is used to transmit programming instructions and application data between CPU 905, I/O devices interface 910, storage 930, network interface 915, and memory 920. Note, CPU 905 is included to be representative of a single CPU, multiple CPUs, a single CPU having multiple processing cores, and the like. Memory 920 is generally included to be representative of a random access memory. Storage 930 may be a disk drive storage device. Although shown as a single unit, storage 930 may be a combination of fixed and/or removable storage devices, such as fixed disc drives, removable memory cards, or optical storage, network attached storage (NAS), or a storage area-network (SAN).

Illustratively, memory 920 includes a management tool 922. And storage 930 includes configuration templates 932 and network profiles 934. The management tool 922 automates provisioning of network elements and resources to interconnected data center fabrics. A network operator may specify (e.g., using of the configuration templates 932), through the management tool 922, values of network attributes for a given network fabric, e.g., LISP-specific attributes, such as map server properties, an amount of RLOCs for the network fabric, gateway IP addresses, etc. In turn, the management tool 922 generates one or more CLIs corresponding to the values specified by the operator. The management tool 922 may send the CLIs to a first hop network device. The first hop network device may retrieve a corresponding network profile 934 from the DCNM server 900. The first hop network device may then execute the commands to configure the network fabric based on the network profile 934. The first hop network device may establish LISP-specific components, e.g., an ingress tunnel router, egress tunnel router, mapping server, etc.

In one embodiment, the management tool 922 may also generate CLI to modify or delete a network fabric configuration based on specifications (e.g., by the network operator). For example, at deletion of a network fabric configuration, the management tool 922 may generate CLI for disabling LISP network components in the fabric and unregistering the network with mapping services in other fabrics.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the management tool 106) or related data available in the cloud. For example, the management tool 106 could execute on a computing system in the cloud and generate CLI for configuring and provisioning LISP mobility on a specified network fabric. In such a case, a network operator could access the management tool 106 on the cloud and store network configuration profiles at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, by a management application, a configuration for a network fabric, wherein the configuration specifies values for one or more attributes associated with a Locator ID Separation Protocol (LISP)-enabled network;
generating one or more commands based on the specified values for the one or more attributes associated with the LISP-enabled network; and
distributing the generated commands to a plurality of network devices in the network fabric, wherein each network device executes at least one of the generated commands to configure the network fabric.

2. The method of claim 1, wherein a first network device of the plurality of network devices registers the network fabric with a mapping database.

3. The method of claim 1, wherein the configuration includes an enabled flag indicating that the network fabric is a LISP network.

4. The method of claim 3, further comprising:
distributing the enabled flag and the configuration to each in the plurality of network devices, wherein each of the network devices executes the at least one of the generated commands based on the configuration to configure the network fabric.

5. The method of claim 1, wherein the one or more attributes associated with the LISP-enabled network includes at least one of a LISP instance identifier, an ingress tunnel router configuration, an egress tunnel router configuration, and an amount of routing locators.

6. The method of claim 1, further comprising:
receiving an indication to delete the configuration of the network fabric;
generating one or more commands to delete the configuration; and
sending the one or more commands to delete the configuration to one of the plurality of network devices.

7. The method of claim 6, wherein the one of the plurality of network devices deletes the configuration from the network fabric.

8. A non-transitory computer-readable medium storing instructions, which, when executed, perform an operation comprising:
receiving, by a management application, a configuration for a network fabric, wherein the configuration specifies values for one or more attributes associated with a Locator ID Separation Protocol (LISP)-enabled network;
generating one or more commands based on the specified values for the one or more attributes associated with the LISP-enabled network; and
distributing the generated commands to a plurality of network devices in the network fabric, wherein each network device executes at least one of the generated commands to configure the network fabric.

9. The computer-readable storage medium of claim 8, wherein a first network device of the plurality of network devices registers the network fabric with a mapping database.

10. The computer-readable storage medium of claim 8, wherein the configuration includes an enabled flag indicating that the network fabric is a LISP network.

11. The computer-readable storage medium of claim 10, wherein the operation further comprises:
distributing the enabled flag and the configuration to each in the plurality of network devices, wherein each of the network devices executes the at least one of the generated commands based on the configuration to configure the network fabric.

12. The computer-readable storage medium of claim 8, wherein the one or more attributes associated with the LISP-enabled network includes at least one of a LISP instance identifier, an ingress tunnel router configuration, an egress tunnel router configuration, and an amount of routing locators.

13. The computer-readable storage medium of claim 8, wherein the operation further comprises:
receiving an indication to delete the configuration of the network fabric;
generating one or more commands to delete the configuration; and
sending the one or more commands to delete the configuration to one of the plurality of network devices.

14. The computer-readable storage medium of claim 13, wherein the one of the plurality of network devices deletes the configuration from the network fabric.

15. A system, comprising:
a processor; and
a memory storing program code, which, when executed by the processor, performs an operation comprising:
receiving, by a management application, a configuration for a network fabric, wherein the configuration specifies values for one or more attributes associated with a Locator ID Separation Protocol (LISP)-enabled network,
generating one or more commands based on the specified values for the one or more attributes associated with the LISP-enabled network, and
distributing the generated commands to a plurality of network devices in the network fabric, wherein each network device executes at least one of the generated commands to configure the network fabric.

16. The system of claim 15, wherein a first network device of the plurality of network devices registers the network fabric with a mapping database.

17. The system of claim 15, wherein the configuration includes an enabled flag indicating that the network fabric is a LISP network.

18. The system of claim 17, wherein the operation further comprises:
   distributing the enabled flag and the configuration to each in the plurality of network devices, wherein each of the network devices executes the at least one of the generated commands based on the configuration to configure the network fabric.

19. The system of claim 15, wherein the one or more attributes associated with the LISP-enabled network includes at least one of a LISP instance identifier, an ingress tunnel router configuration, an egress tunnel router configuration, and an amount of routing locators.

20. The system of claim 15, wherein the operation further comprises:
   receiving an indication to delete configuration of the network fabric;
   generating one or more commands to delete the configuration; and
   sending the one or more commands to delete the configuration to one of the plurality of network devices.

* * * * *